US010758933B2

(12) United States Patent
Young, II

(10) Patent No.: US 10,758,933 B2
(45) Date of Patent: Sep. 1, 2020

(54) FLUID REGULATION SYSTEM

(71) Applicant: Carlisle Fluid Technologies, Inc., Scottsdale, AZ (US)

(72) Inventor: Roy Earl Young, II, Indianapolis, IN (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 15/445,672

(22) Filed: Feb. 28, 2017

(65) Prior Publication Data

US 2017/0252771 A1 Sep. 7, 2017

Related U.S. Application Data

(60) Provisional application No. 62/302,044, filed on Mar. 1, 2016.

(51) Int. Cl.

| | |
|---|---|
| ***B05C 11/10*** | (2006.01) |
| ***B05B 12/00*** | (2018.01) |
| ***B05B 12/08*** | (2006.01) |
| ***B05B 12/02*** | (2006.01) |
| ***B05C 5/02*** | (2006.01) |
| ***B05C 15/00*** | (2006.01) |
| ***B05C 21/00*** | (2006.01) |

(Continued)

(52) U.S. Cl.

CPC .......... *B05C 11/1005* (2013.01); *B05B 12/00* (2013.01); *B05B 12/002* (2013.01); *B05B 12/02* (2013.01); *B05B 12/08* (2013.01); *B05C 5/0225* (2013.01); *B05C 15/00* (2013.01); *B05C 21/00* (2013.01); *B05B 5/0532* (2013.01); *B05B 7/1209* (2013.01); *B05B 7/2489* (2013.01); *B05B 12/081* (2013.01)

(58) Field of Classification Search

None

See application file for complete search history.

(56) References Cited

U.S. PATENT DOCUMENTS 4,516,700 A 5/1985 Guzowski
4,722,624 A 2/1988 O'Brien (Continued)

FOREIGN PATENT DOCUMENTS

CN 101585026 A 11/2009
CN 104858079 A 8/2015

(Continued)

OTHER PUBLICATIONS

PCT International Search Report and Written Opinion for PCT Application No. PCT/US2017/020177 dated May 23, 2017, 15 Pages.

(Continued)

*Primary Examiner* — Nathan T Leong

(74) *Attorney, Agent, or Firm* — Fletcher Yoder P.C.

(57) ABSTRACT

A system includes a spray tool including a trigger and a sensor. The system includes a fluid regulation system including a container configured to store a coating material and a pump configured to control a flow of the coating material. The system includes a pump control system including a controller configured to change an operating parameter of the pump distributing the coating material in response to an input from the sensor. The pump control system is coupled to the fluid regulation system.

18 Claims, 3 Drawing Sheets

(51) Int. Cl.

| | |
|---|---|
| *B05B 5/053* | (2006.01) |
| *B05B 7/12* | (2006.01) |
| *B05B 7/24* | (2006.01) |

(56) References Cited

U.S. PATENT DOCUMENTS

| | | | | | |
|---|---|---|---|---|---|
| 4,928,880 | A * | 5/1990 | Prus | B05B 12/085 239/8 |
| 4,998,672 | A * | 3/1991 | Bordaz | B05B 7/32 239/307 |
| 5,156,340 | A | 10/1992 | Lopes | |
| 5,171,613 | A * | 12/1992 | Bok | B01F 5/0619 427/422 |
| 5,381,962 | A | 1/1995 | Teague | |
| 5,711,483 | A | 1/1998 | Hays | |
| 6,500,262 | B1 * | 12/2002 | Bednarz | B05B 15/00 118/696 |
| 6,935,575 | B2 | 8/2005 | Lacchia et al. | |
| 7,503,338 | B2 | 3/2009 | Harrington et al. | |
| 8,109,685 | B1 * | 2/2012 | Vito | A46B 5/0095 401/188 R |
| 8,775,077 | B2 * | 7/2014 | Nielsen | G01C 15/02 701/484 |
| 2011/0189032 | A1 | 8/2011 | Hukriede et al. | |
| 2012/0009329 | A1 | 1/2012 | Mather et al. | |

FOREIGN PATENT DOCUMENTS

| | | | |
|---|---|---|---|
| DE | 202007000133 | U1 | 4/2007 |
| JP | H02155493 | A | 6/1990 |
| JP | 2008055266 | A | 3/2008 |
| JP | 2017070889 | A | 4/2017 |
| WO | 2005018825 | A1 | 3/2005 |
| WO | 2016127106 | A1 | 8/2016 |

OTHER PUBLICATIONS

Japanese Office Action for JP Application No. 2018-545944 dated Oct. 29, 2019, 3 pgs.

Japanese Office Action for JP Application No. 2018-545944 dated Mar. 31, 2020, 3 pgs.

Chinese Office Action for CN Application No. 201780025270.X dated May 13, 2020, 9 pgs.

* cited by examiner

FLUID REGULATION SYSTEM

CROSS REFERENCE TO RELATED APPLICATIONS

This application claims priority from and the benefit of U.S. Provisional Patent Application No. 62/302,044, entitled "FLUID REGULATION SYSTEM," filed Mar. 1, 2016, which is hereby incorporated by reference in its entirety.

BACKGROUND

The present application relates generally to pump control methods for pumps associated with spray tools to deliver coating materials.

Spray tools output sprays of coating materials to coat objects for aesthetic or utilitarian purposes. For example, spray tools may be used to paint or stain objects. In operation, the coating material is stored in a container until it is conveyed or pumped to the spray tool. The coating material may be conveyed through a fluid regulator which is manually or pneumatically adjusted. Unfortunately, manually or pneumatically adjusting the fluid flow through the fluid regulator may contribute to varying output pressure of the coating material flow to the spray tool. The varied output pressure may lead to undesirable variations in the spray pressure and spray patterns resulting in rejected sprayed objects.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment a system includes a spray tool including a trigger and a sensor. The system includes a fluid regulation system including a container configured to store a coating material and a pump configured to control a flow of the coating material. The system includes a pump control system including a controller configured to change an operating parameter of the pump distributing the coating material in response to an input from the sensor. The pump control system is coupled to the fluid regulation system.

In another embodiment a method includes operating a valve that controls flow of a coating material in a spray tool in response to a trigger coupled to the spray tool. The method includes operating a pump that supplies the coating material to the spray tool in response to a signal received from a sensor coupled to the spray tool.

In another embodiment, a tangible, non-transitory computer-readable media stores computer instructions that, when executed by a processor, process a signal generated in response to operation of a trigger that controls flow of a coating material in a spray tool. The computer instructions, when executed by the processor, operate a pump that supplies the coating material to the spray tool in response to the signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
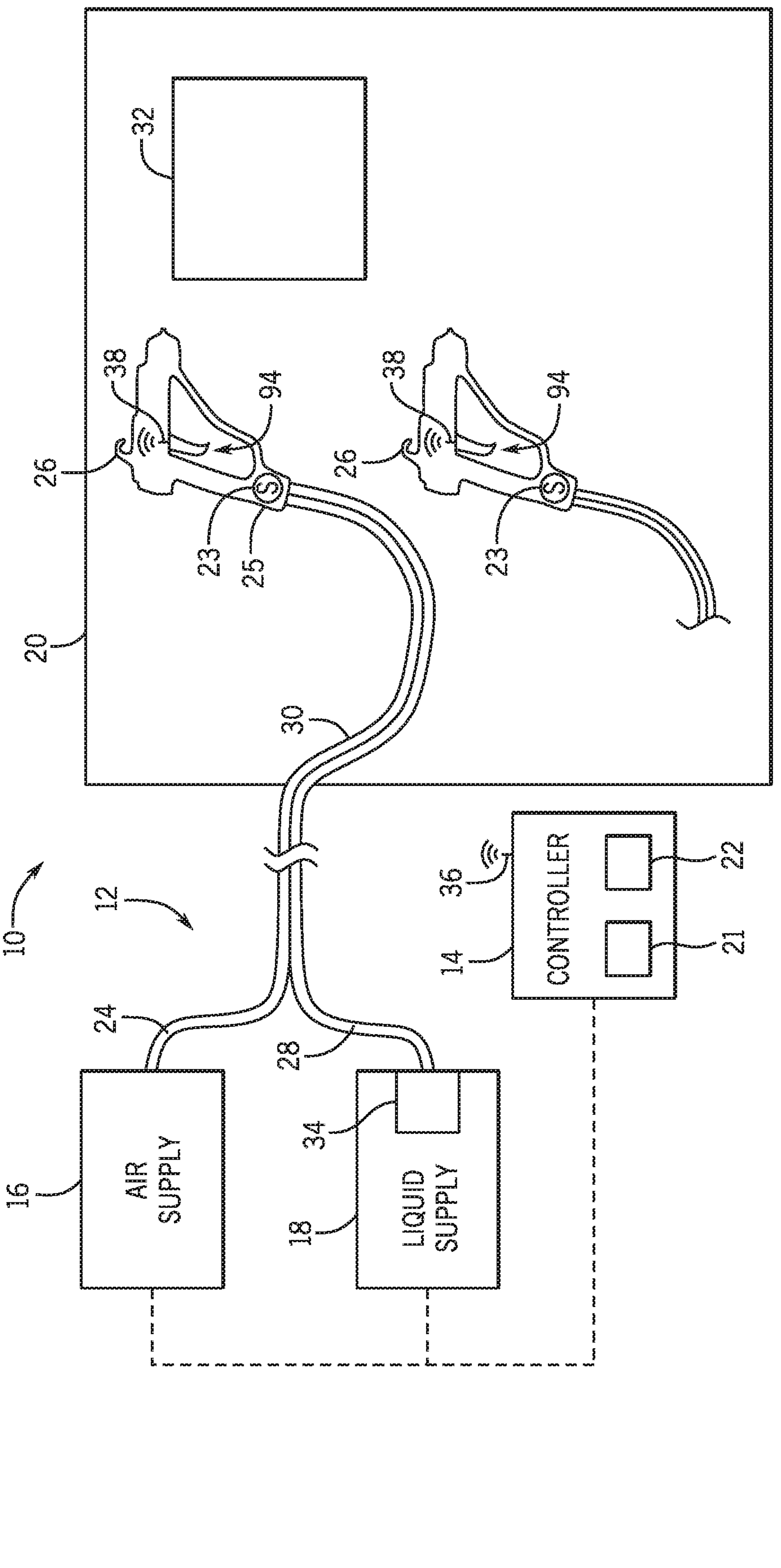
FIG. 1 is a schematic diagram of an embodiment of a spray system that utilizes a fluid regulation system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to a fluid regulation system capable of wirelessly controlling the flow of a coating material that is conveyed from a pump and/or tank to a spray tool (e.g., a spray gun or spray coating applicator), such as a manual spray tool that is manually operated by an operator. More specifically, the disclosure is directed towards a controller that adjusts one or more operating parameters (e.g., flow rate and/or pressure) of a fluid supply (e.g., pump and/or tank) to reduce variations or fluctuations in fluid flow conditions (e.g., flow rate and/or pressure) affecting a spray of coating material by the spray tool. The control of the fluid supply (e.g., pump and/or tank) is particularly useful in manual operation of spray tools, because the control may help to correct for any incorrect, imperfect, or inefficient use of the spray tool due to the manual operation. In other words, the control of the fluid supply may help increase the performance and quality of the spray coating procedures performed by the operator. As will be discussed in detail below, the controller adjusts one or more operating parameters of a pump (e.g., a positive displacement pump) to maintain process control and provide more consistent fluid flow of the coating material to the spray tool. For example, the controller may adjust pump operating parameters, such as flow rate and/or pressure. Reducing the occurrence of undesired flow rate and/or pressure changes of the coating material may result in improved process control, thereby reducing the number of sprayed objects that do not meet target specifications (e.g., rejected parts). For example, a more uniform flow rate and pressure of the coating material may provide a more consistent distribution and spread of droplets or particles in the spray from the spray tool, thus providing a more consistent application of the coating material on a target object. The controller may receive a signal from a sensor and/or transmitter coupled to the spray tool. The sensor and/or transmitter may be coupled to an outer housing of the spray tool or integral to the spray tool. Other sensors may also be disposed throughout the fluid regulation system. In the illustrated embodiments, the spray tool includes a trigger that, when activated (e.g., pulled toward a handle), sends a signal from the sensor to a receiver in response to sending a change in the trigger. The sensors may monitor various operating conditions, including but not limited to, a flow rate and/or pressure of the coating material provided by the fluid supply (e.g., pump or tank) to the spray tool, a level of coating material in a liquid supply container or tank, a distance between the spray tool and a target object, characteristics of the coating material (e.g., viscosity, ratio of materials such as resin and hardener, color, temperature, etc.), a flow rate and/or pressure of an atomization gas (e.g., air) provided to the spray tool, a rotational speed of a rotary bell cup of a rotary spray tool, a current and/or voltage of electrostatics in an electrostatic spray tool, environmental conditions (e.g., humidity, temperature, etc.), or other operating conditions. The controller utilizes the signal received by the receiver to generate a control command for the fluid supply (e.g., pump and/or tank). For example, the control command (e.g., pump control command) may include adjusting the flow rate and/or pressure of the pump based at least in part on the sensor feedback and/or a user input.

FIG. 1 is a schematic diagram of an embodiment of a spray system 10 that utilizes a fluid regulation system 12. The fluid regulation system 12 may include a controller 14 (e.g., an electronic controller or computer-based control system), a gas supply (e.g., an air supply 16), and a coating material supply (e.g., a powder and/or liquid supply 18) positioned externally to a containment room 20 (e.g., paint kitchen). The containment room 20 may be sealed to inhibit paint droplets or other coating material fumes from spreading to unwanted areas. The containment room 20 may be insulated from electrical or other influences to block contaminants from entering the containment room 20. In some instances, the containment room 20 may be used to spray or apply coating material that is regulated or potentially hazardous. Under such circumstances, the components and devices used in the containment room 20 may be constructed to provide additional protection against ignition of the coating material. As such, it may be desirable to locate electronic components external to the containment room 20.

For example, the controller 14 may be located externally from the containment room 20 as it may include electrical components such as a processor 21 and a memory 22. The processor 21 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 21 may include one or more reduced instruction set (RISC) processors or complex instruction set (CISC) processors. The processor 21 may execute instructions or non-transitory code and receive and distribute signals between various locations within the spray system 10. The instructions may be encoded in programs or code stored in a tangible non-transitory computer-readable medium, such as the memory 22, configured to perform the various functions of the controller 14. The memory 22, in the embodiment, includes a computer readable medium, such as, without limitation, a hard disk drive, a solid state drive, diskette, flash drive, a compact disc, a digital video disc, random access memory (RAM and/or flash RAM), and/or any suitable storage device that enables the processor 21 to store, retrieve, and/or execute instructions (e.g., software or firmware) and/or data (e.g., thresholds, ranges, etc.). The memory 22 may include one or more local and/or remote storage devices.

The instructions may utilize feedback from one or more sensors 23 or user inputs within the containment room 20, as explained in detail below. In the illustrated embodiment, one or more sensors 23 are coupled to a spray tool 26. The sensors 23 may include, couple to, or integrate with communications circuitry, e.g., wired communications circuitry or wireless communications circuitry (e.g., a wireless transmitter, receiver, or transceiver). In some embodiments, the sensors 23 may be electrically wired back to the controller 14, the air supply 16, and/or the liquid supply 18 via one or more electrical cables coupled to or integrated with a fluid conduit or hose 30 (e.g., internal or external to the conduit), such as an air hose. The sensors 23 may be coupled to various portions of the spray tool 26 depending on the type and configuration of the spray tool 26. The spray tool 26 may include a handheld and/or manual spray tool (e.g., spray gun or applicator), a powder coat spray tool (e.g., applies powder coating material), a liquid coat spray tool (e.g., applies a liquid coating material), an electrostatic spray tool, a rotary atomizer spray tool (e.g., a rotary bell cup spray tool), a hydraulic atomizer spray tool (e.g., atomizes coating material without a gas), pneumatic atomizer spray tool (e.g., atomizes coating material with assistance of a gas such as air), a gravity fed spray tool (e.g., with a gravity feed container disposed above and coupled to the spray tool), a siphon feed spray tool (e.g., with a siphon feed container disposed below and coupled to the spray tool), a or any combination thereof. Depending on the configuration, the spray tool 26 may include any number or type of manual inputs, such as one or more triggers, valve adjusters, voltage adjusters, current adjusters, motor speed adjusters (e.g., for a rotary bell cup), or any combination thereof. As a result, the sensors 23 may be coupled to an outer housing 25 of the spray tool 26, or the sensors 23 may be integrated within the spray tool 26 (e.g., within a trigger 94), along a fluid passage (e.g., powder passage, liquid passage, and/or gas passage such as air passage), at a valve or valve adjuster (e.g., liquid valve, atomizing air valve, shaping air valve, etc.), at a fluid inlet (e.g., gas, liquid, or powder inlet), at a spray tip adjacent a forming spray, or any combination thereof. In some embodiments, sensor feedback may also be provided from sensors disposed outside the containment room 20.

The controller 14 may be in electronic communication with the air supply 16, the liquid supply 18, one or more spray tools 26, or other devices within the containment room 20 via wired and/or wireless communications devices (e.g., transmitters, receivers, and/or transceivers). The air supply 16 pressurizes and delivers air 24, which may be used to power pneumatic devices, atomize or shape a spray of a coating material (e.g., liquid and/or powder), or other uses within the containment room 20. In certain embodiments, the liquid supply 18 pressurizes liquid 28 for delivery to the spray tools 26. The liquid 28 may flow along a hose 30 to the spray tool 26 where an object 32 is sprayed by the spray tool 26. These embodiments may include fluid regulators that are regulated by manual or pneumatic adjustment. Fluid regulator output pressure can vary greatly, which may increase or decrease fluid flow to the spray tool 26. In other embodiments, the liquid supply 18 may include a pump 34 (e.g., a positive displacement pump) that displaces a set volume of liquid 28 rather than pressurizing the liquid 28 within the hose 30. The positive displacement pump 34 may include rotary-type positive displacement pumps such as internal gear, or screw type pumps. The liquid 28 may be displaced by one or more rotating gears that force a specific amount of liquid through the positive displacement pump 34. The gears may include vanes or flexible impellers that force the liquid forward while maintaining a tight seal within the positive displacement pump 34. The positive displacement pump 34 may also include reciprocating positive displacement pumps where a piston, plunger, or some other sealing membrane reciprocates or oscillates from one position to another to convey the liquid 28 through the hose 30. Utilizing a positive displacement pump may provide more consistent fluid flow to the spray tool 26, thereby resulting in improvements in process control as explained in detail below.

The spray tool 26 includes one or more inputs, valves, and/or triggers to control the application of the coating material (e.g., liquid and/or powder) to the object 32. While using the positive displacement pump 34, it is beneficial if the valves and triggers open concurrently to avoid excess pressure building within the hose 30. That is, if the positive displacement pump 34 runs without the valves open, an excess volume of fluid is being pumped into the hose 30 with no place to exit. The excess volume of fluid, therefore, pressurizes the hose 30, which may result in potential wear to the hose 30, and/or the spray tool 26. To improve concurrent triggering of fluid 28 into the hose 30 and out of the spray tool 26, the controller 14 may trigger the positive displacement pump 34 in response to a wireless signal sent from the spray tool 26 within the containment room 20. The controller 14 includes a wireless signal receiver 36 that receives the signal from the sensor 23 and/or a transmitter 38 on the spray tool 26 as detailed below. It may be appreciated that the wireless signal receiver 36 enables the pump 34 to be turned on or to be turned off remotely, without using a wired or pneumatic signal. However, in some embodiments, the controller 14 may operate with wired communications, pneumatic controls, wireless controls, or any combination thereof.

Figure 2:
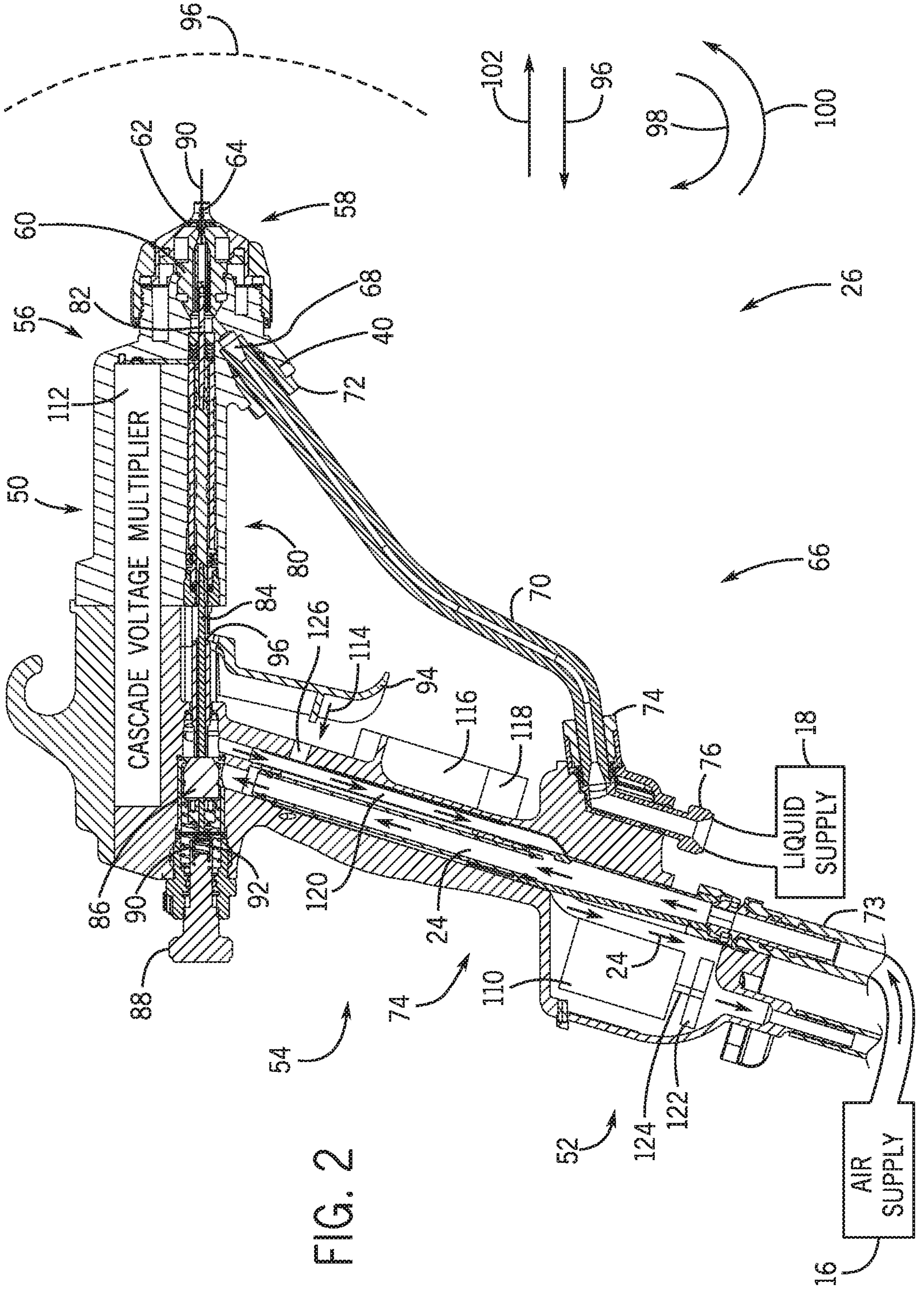
FIG. 2 is a cross-sectional side view of a spray tool with a wireless signal transmitting system.

FIG. 2 is a cross-sectional side view of a spray tool 26 with a wireless signal transmitting system 50. The wireless signal transmitting system 50 enables an operator to selectively trigger the positive displacement pump 34 to pump fluid 28 to the hose 30 and eventually to the object 32. The wireless signal transmitting system 50 may be powered by a power assembly 52 that may also be used to apply electric charge to the liquid as it is sprayed from the spray tool 26. As illustrated, the spray tool 26 may be configured to electrically charge while spraying the liquid 28 (e.g., paint, solvent, or various coating materials) towards an electrically attractive object 32.

As illustrated, the spray tool 26 includes a handle 54, a barrel 56, and a spray tip assembly 58. The spray tip assembly 58 includes a fluid nozzle 60, air atomization orifices 62, and one or more spray shaping air orifices 64, such as spray shaping orifices 64 that use air jets to force the spray to form a desired spray pattern (e.g., a flat spray). The spray tip assembly 58 may also include a variety of other atomizers to provide a desired spray pattern and droplet distribution. For example, the spray tip assembly 58 may include a rotary bell cup or other rotary atomizer.

The spray tool 26 includes a variety of controls and supply mechanisms. As illustrated, the spray tool 26 includes a liquid delivery assembly 66 having a liquid passage 68 extending from the fluid nozzle 60. Included in the liquid delivery assembly 66 is a liquid tube 70. The liquid tube 70 includes a first tube connector 72 and a second tube connector 74. The first tube connector 72 couples the liquid tube 70 near the spray tip assembly 58. The second tube connector 74 couples the liquid tube 70 to the handle 54. The handle 54 includes a material supply coupling 76, enabling the spray tool 26 to receive material from the liquid supply 18. Accordingly, during operation, the liquid 28 flows from the liquid supply 18 through the handle 54 and into the liquid tube 70, where the liquid 28 is transported to the fluid nozzle 60 for spraying.

In order to control liquid and air flow, the spray tool 26 includes a valve assembly 80. The valve assembly 80 simultaneously controls liquid and air flow as the valve assembly 80 opens and closes. The valve assembly 80 extends from the handle 54 to the barrel 56. The illustrated valve assembly 80 includes a fluid nozzle needle 82 and an air valve needle 84, which couples to an air valve 86. The valve assembly 80 movably extends between the liquid nozzle 60 and a liquid adjuster 88. The liquid adjuster 88 is rotatably adjustable against a spring 90 disposed between the air valve 86 and an internal portion 92 of the liquid adjuster 88. The liquid adjuster 88, in some embodiments, may combine with other adjustment tools to adjust the amount of air passing through the air valve needle 84. The valve assembly 80 couples to a trigger 94 at point 96, such that the fluid nozzle needle 82 of the valve assembly 80 moves inwardly 96 and away from the fluid nozzle 60 as the trigger 94 rotates toward the handle 54 (e.g., in a clockwise direction 98). As the fluid nozzle needle 82 retracts, fluid begins flowing into the fluid nozzle 60. Likewise, when the trigger 94 rotates away from the handle 54 (e.g., in a counter-clockwise direction 100), the fluid nozzle needle 82 moves in direction 102 sealing the fluid nozzle 60 and blocking further fluid flow.

As described above, the system may include one or more sensors 23 coupled to the triggers 94 of the spray tools 26, fluid passages in the spray tools 26, other inputs and outputs on the spray tools 26, the target object 32, and other spray equipment inside and/or outside of the containment room 20. For example, the sensors 23 may be distributed throughout spray tools 26 (e.g., spray guns), conduits, flow control devices (e.g., valves, pressure regulators, etc.), fluid tanks or supplies (e.g., gas tanks and/or liquid tanks), powder tanks or supplies, pumps, compressors, hoppers or solids feeders, fluid mixers, powder mixers, or any combination thereof. The sensors 23 are configured to monitor operating conditions of the components of the fluid regulation system 12, such as the spray tool 26, the fluid supply (e.g., pump 34 and/or tank), the target object 32, fluid mixing equipment, or any related spray equipment. For example, the sensors 23 may monitor the duration of time the trigger 94 is activated, the actual times of trigger 94 activations (e.g., time stamps), the frequency of trigger 94 activations, the degree or distance of trigger 94 activations (e.g., percent of full range of trigger pull; any variation in trigger pulls during each trigger pull, across a set of trigger pulls, across all trigger pulls for a project, etc.), material characteristics (e.g., flow rate, pressure, velocity, temperature viscosity, material composition, fluid to air ratio, powder to air ratio, resin to hardener ratio, etc.) of the coating material being conveyed to the spray tool 26, a distance between the spray tool 26 and the target object, movement of the spray tool 26 (e.g., speed, direction of movement, acceleration, deceleration, etc.), environment conditions (e.g., temperature, pressure, or humidity), or other operating conditions, or any combination thereof. Again, the sensor feedback may help to monitor and control operation of the spray tools 26 and the generated sprays and coatings inside the containment room 20 by remotely controlling various equipment and operational parameters outside the containment room 20, such as upstream components (e.g., fluid supplies, pumps, compressors, tanks, mixers, etc.), characteristics of fluids (e.g., gas and liquid), such as air and paint, characteristics of fluidized solid particulate (e.g., solid particulate disposed in a gas or liquid flow), such as air and powder, or any combination thereof. By enabling remote control of equipment outside of the containment room 20, the operator of the spray tool 26 is able to more efficiently operate the spray tool 26 inside the containment room 20 without downtime for adjusting controls and without leaving the containing room 20. The operator of the spray tool 26 is also able to increase uptime and continuous spraying, because the controller 14 may automatically adjust and correct for variations in the coating material (e.g., flow rate, pressure, viscosity, material composition, etc.), variations in the output spray (e.g., droplet size, distribution, spread, speed, etc.), environmental conditions, and so forth. The controller 14 also may collect raw data from the sensor feedback, process and analyze the raw data, and produce outputs (e.g., reports, alarms, messages, recommended servicing, recommended operator training, etc.). For example, the controller 14 may generate reports of adjustments to the fluid supply (e.g., pump and/or tank) and the spray tool 26 due to improper, inefficient, or imperfect operation of the equipment or the operator manually using the spray tool 26.

In certain embodiments, the sensors 23 may send signals to a receiver which is configured to receive the signals from the sensors 23. The controller 14 may utilize the data received from the receiver 36 to vary the flow rate and/or pressure of the pump 34. For example, when the trigger 94 is activated (e.g., moved in a clockwise 98 direction by a user), the sensors 23 coupled to the trigger 94 are then activated and send signals to the receiver 36. The controller 14 may then be utilized to generate a pump control command to operate the pump 34 based on the sensor input received and/or the user input received. In some embodiments, the controller 14 may utilize closed-loop control to generate a control sequence to meet the target operating conditions of the fluid regulation system 12.

Returning to the discussion of the spray tool 26, the power assembly 52 includes an electric generator 110, a cascade voltage multiplier 112, a trigger switch 114, and a transmitter 116 that may be powered by the power assembly 52 or by a battery 118. To produce the electric charge, air from the air supply 16 is distributed into an electric generator air passage 120. The electrical generator air passage 120 directs air 24 through the handle 18 and into contact with a turbine 122 (e.g., a rotor having a plurality of blades). The air 24 flows against and between the blades to drive rotation of the turbine 122 and a shaft 124, which in turn rotates the electric generator 110. The electrical generator 52 converts the mechanical energy from the rotating shaft 124 into electrical power for use by the cascade voltage multiplier 112, the trigger switch 114 and the transmitter 116. The trigger switch 114 may include a detection point 126 that is activated when the trigger 94 is depressed.

Figure 3:
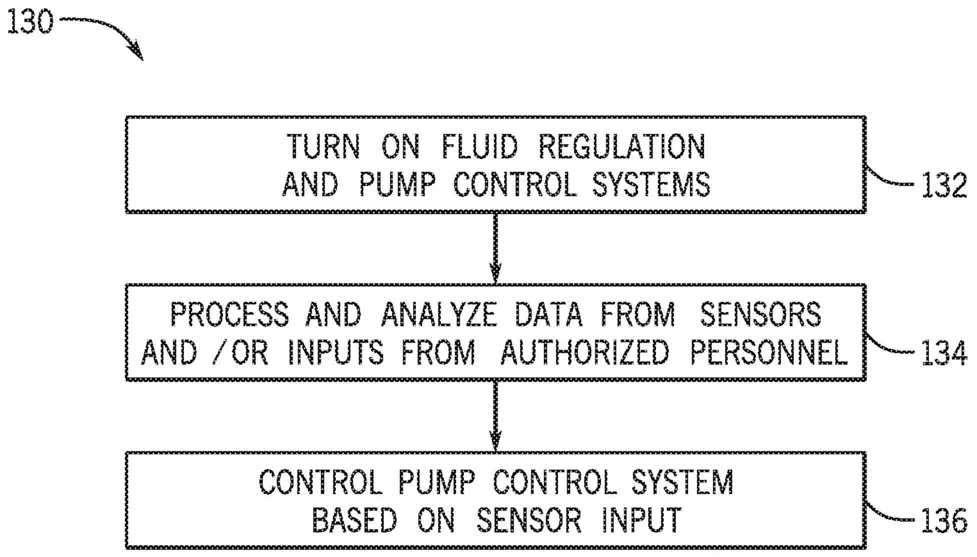
FIG. 3 is a flow chart of an embodiment of a method for controlling the fluid regulation system shown in FIG. 1.

FIG. 3 is a flow chart of an embodiment of a computer-implemented method 130 for controlling the fluid regulation system 12 shown in FIGS. 1 and 2. The controller 14, for example, may perform the method 130. The method 130 begins when the fluid regulation system 12 is turned on and begins to regulate the flow of the coating material through the pump 34 that is supplied to the spray gun (block 132). Regulating the flow of the coating material through the pump that is conveyed to the spray gun may result in more consistent pressure of the coating material. For example, without regulating the flow of the coating material, the pressure of the coating material may suddenly increase or decrease. The sudden change of the pressure of the coating material may result in uneven coating of the sprayed object, changes in spray pattern, or other undesirable effects. These undesirable effects may result in rejected sprayed objects by failing to meet customer standards. Thus, regulating the pressure of the coating material may reduce pressure variations.

The method 130 includes utilizing a receiver for receiving sensor input from one or more sensors coupled to the trigger or other components of the spray tool 26 (block 134). The sensor input may wirelessly transmit signals to the receiver. The sensor may monitor operating conditions of the fluid regulation system, such as a flow rate of the coating material through the spray gun, the amount of time the trigger is activated, among others. The method 130 may include utilizing the receiver for receiving user input (e.g., from an operator or authorized personnel). For example, the operator may input a target pump flow rate, a liquid (e.g., coating material) supply level, a desired coating thickness (e.g., on the sprayed object), and so forth.

The method 130 includes controlling the pump control system based at least in part on the sensor input and/or the user input (block 136). For example, the pump control system may increase the pump flow rate when a greater amount of coating material needs to be supplied to the sprayed object. The pump control system may decrease the pump flow rate when less coating material needs to be sprayed. In one example, the pump control system may continuously convey the coating material until a target is reached. For example, the pump control system may instruct the pump to convey the coating material to the spray gun until a level within the liquid supply (e.g., coating material) container is reached. In another example, the pump control system may instruct the pump to convey the coating material to the spray gun until a desired thickness of the coating material (e.g., on the sprayed object) is reached. In yet another example, the pump control system may instruct the pump to convey the coating material to the spray gun for a prescribed amount of time (e.g., 1 to 60 seconds, 2 to 40 seconds, 5 to 30 seconds).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:

a manual spray tool comprising:

a trigger and a sensor, wherein the sensor is disposed within the trigger and is configured to output a wireless signal;

a wireless signal transmitting system including the sensor; and a power assembly comprising an electric generator and a cascade voltage multiplier, wherein the power assembly is configured to power the wireless signal transmitting system, wherein the power assembly is further configured to apply an electric charge to a spray of a coating material discharged by the manual spray tool;

a fluid regulation system, comprising:

a container configured to store the coating material;

a pump configured to control a flow of the coating material; and a pump control system, comprising:

a controller comprising a wireless signal receiver configured to receive the wireless signal, wherein the controller is configured to change an operating parameter of the pump distributing the coating material based on the wireless signal, wherein the pump control system is coupled to the fluid regulation system.

2. The system of claim 1, wherein the manual spray tool is located inside a containment room, and the pump control system is located outside the containment room.

3. The system of claim 2, wherein the fluid regulation system is located within the containment room.

4. The system of claim 1, wherein the pump comprises a positive displacement pump.

5. The system of claim 1, wherein the operating parameter of the pump comprises a flow rate, a pressure, or a combination thereof.

6. The system of claim 1, wherein the sensor is configured to monitor one or more parameters of the trigger.

7. The system of claim 6, wherein the one or more parameters of the trigger comprises a duration of activation, a frequency of activation, a time stamp of activation, a degree or distance of activation, a variation in activation, or any combination thereof.

8. The system of claim 1, comprising a second sensor of the manual spray tool, wherein the second sensor is configured to monitor one or more parameters of the coating material, the spray of the coating material output by the manual spray tool, or a coating applied on a target object using the spray.

9. The system of claim 1, wherein the manual spray tool comprises communications circuitry coupled to the sensor.

10. The system of claim 9, wherein the communications circuitry comprises wireless communications circuitry.

11. The system of claim 1, wherein the trigger is configured to open a valve in the manual spray tool while also triggering the sensor to output the wireless signal.

12. A spray system, comprising:

a manual spray tool comprising:

a trigger and a sensor, wherein the manual spray tool is configured to discharge a spray of coating material, and wherein the sensor is integrated with the trigger and is configured to output a wireless signal;

a wireless signal transmitting system including the sensor; and a power assembly comprising an electric generator and a cascade voltage multiplier, wherein the power assembly is configured to power the wireless signal transmitting system, wherein the power assembly is further configured to apply an electric charge to the spray of the coating material discharged by the manual spray tool;

a liquid supply configured to store the coating material, wherein the liquid supply comprises a positive displacement pump configured to control a flow of the coating material from the liquid supply to the manual spray tool; and a controller communicatively coupled to the positive displacement pump and comprising a wireless signal receiver configured to receive the wireless signal, wherein the controller is configured to change an operating parameter of the positive displacement pump distributing the coating material based on the wireless signal.

13. The spray system of claim 12, wherein the manual spray tool is located inside a containment room, and the liquid supply and the controller are located outside the containment room.

14. The spray system of claim 12, wherein the sensor is disposed within the trigger.

15. The spray system of claim 12, wherein the sensor is configured to monitor a trigger parameter comprising a duration of trigger activation, a frequency of trigger activation, a degree or distance of trigger activation, a variation in trigger activation, or any combination thereof, and wherein the sensor is configured to send the wireless signal based on the trigger parameter.

16. A spray system, comprising:

a manual spray tool comprising:

a trigger and a sensor, wherein the manual spray tool is configured to discharge a spray of coating material, wherein the sensor is integrated with the trigger and is configured to output a wireless signal, and wherein the manual spray tool is located within a containment room;

a wireless signal transmitting system including the sensor; and a power assembly comprising an electric generator and a cascade voltage multiplier, wherein the power assembly is configured to power the wireless signal transmitting system, wherein the power assembly is further configured to apply an electric charge to the spray of the coating material discharged by the manual spray tool;

a liquid supply configured to store the coating material, wherein the liquid supply comprises a positive displacement pump configured to control a flow of the coating material from the liquid supply to the manual spray tool, and wherein the liquid supply is disposed outside of the containment room; and a controller communicatively coupled to the positive displacement pump and comprising a wireless signal receiver configured to receive the wireless signal, wherein the controller is configured to change an operating parameter of the positive displacement pump to control the flow of the coating material based on the wireless signal, wherein the controller is disposed outside of the containment room.

17. The spray system of claim 16, wherein the sensor is disposed within the trigger.

18. The spray system of claim 17, wherein the manual spray tool comprises a second sensor integrated with the manual spray tool, wherein the second sensor is disposed along a fluid passage of the manual spray tool, wherein the second sensor is configured to output a second wireless signal, wherein the second wireless signal includes feedback related to a characteristic of a fluid flowing through the fluid passage, and wherein the controller is configured to change the operating parameter of the positive displacement pump to control the flow of the coating material based on the second wireless signal.

* * * * *